United States Patent [19]

Coco et al.

[11] Patent Number: 4,963,604
[45] Date of Patent: Oct. 16, 1990

[54] POLYMERIC PIGMENTS USED IN PAPER COATING COMPOSITIONS AND A PROCESS FOR THEIR PREPARATION

[75] Inventors: Charles E. Coco; Lawrence M. Scacciaferro, both of St. louis, Mo.

[73] Assignee: Protein Technologies International, Inc., St. Louis, Mo.

[21] Appl. No.: 315,216

[22] Filed: Feb. 24, 1989

Related U.S. Application Data

[63] Continuation of Ser. No. 60,694, Jun. 11, 1987, abandoned.

[51] Int. Cl.$^5$ .......................... C08L 89/00; C08J 3/00; C08H 1/00
[52] U.S. Cl. ........................................ 524/17; 524/20; 524/25; 524/26; 524/445; 527/201; 527/207; 427/411; 427/414; 156/328
[58] Field of Search .................. 524/17, 20, 25, 26, 524/445; 527/201, 207, 300, 311, 312, 313, 314; 427/411, 414; 156/328

[56] References Cited

U.S. PATENT DOCUMENTS 4,474,694  10/1984  Coco et al. .......................... 530/407
4,607,089  8/1986  Riley et al. .......................... 527/201
4,689,381  8/1987  Krinski et al. ...................... 527/201

OTHER PUBLICATIONS

Brandrup et al. (editors) Polymer Handbook, John Wiley and Sons, New York, 1975, pp. III–143 and III15-2–154.

Primary Examiner—Nathan M. Nutter
Attorney, Agent, or Firm—Virgil B. Hill

[57] ABSTRACT

A polymeric or plastic pigment, useful as a partial replacement for the inorganic pigment conventionally employed in paper coating compositions is disclosed. The pigment comprises a copolymer of an animal or vegetable protein and a monomer havingh a glass transition temperature (Tg) greater than about 70° C. polymerized in a surfactant free system. When employed in paper coating compositions the pigment provides a coating of improved gloss and ink holdout, as compared to a coating in which the pigment composition consists only of an inorganic material. Improved water resistance, improved water holding and a potential for reduction in the coating sticking to the calender during the paper finishing process are obtained as compared to conventional polymeric pigments.

41 Claims, No Drawings

POLYMERIC PIGMENTS USED IN PAPER COATING COMPOSITIONS AND A PROCESS FOR THEIR PREPARATION

This is a continuation of application Ser. No. 060,694, filed June 11, 1987, now abandoned.

BACKGROUND OF THE INVENTION

The present invention relates to a polymeric pigment suitable for use in paper coating compositions as well as a process for production of the pigment.

Pigment containing coatings have been conventionally employed for the coating of paper. The function of the pigment in the coating is to fill in irregularities of the paper surface and provide an even and uniformly absorbent surface for printing. Most of the pigment coatings employed for the coating of paper contain an inorganic pigment as the primary ingredient. Among the common inorganic pigments employed in paper coating include various grades of clay, calcium carbonate, titanium dioxide, zinc oxide, and calcium sulfate. Coatings containing a large percentage of an inorganic pigment of the above type also include an adhesive binder, such as isolated soy protein.

More recently various types of polymeric particles have been employed as a pigment in combination with an inorganic pigment to provide a pigment composition or dispersion for paper coating. This combination type of pigment composition was developed primarily for use on lightweight coated papers. The purpose of the polymeric pigment was to reduce the weight of the coating by partial substitution of the clay containing pigment with a lighter weight pigment and yet provide the necessary degree of gloss, smoothness and printability. Pigments of this type are generally described in U.S. Pat. Nos. 3,779,800; 3,853,579 and 3,949,138.

While the polymeric pigments described above have permitted a user to reduce the percentage of inorganic pigment in a paper coating composition, nevertheless, the coating properties of the composition are less than may be desired, in that the necessary runability, gloss, brightness, printability, and water resistance are not obtained with every type of paper stock and with every type of coating process.

Soy protein is typically added to the coating formulation to compensate for these deficiencies in the polymeric pigment system. Improved calendering with higher gloss levels and reduced coating adhesion to the calendar are also achieved if soy protein is employed as an adhesive binder. It would therefore be desirable if one were able to develop a polymeric pigment useful in a paper coating composition as a partial substitute for an inorganic pigment, yet obtain a pigment composition which combines the advantageous effects of conventional polymeric pigments and protein with additional benefits of improved coating strength and water resistance.

It is therefore an object of the present invention to provide a polymeric pigment for use in paper coating compositions.

It is also an object of the present invention to provide a polymeric pigment for use in paper coating compositions in combination with an inorganic pigment.

It is a still further object of the present invention to provide a process for the production of these polymeric pigments.

SUMMARY OF THE INVENTION

The present invention relates to a polymeric pigment useful in paper coating compositions preferably as a partial replacement for inorganic pigments conventionally used therein, in which the polymeric pigment comprises a copolymer consisting essentially of protein and a monomer having a glass transition temperature greater than about 70° C., or combination of monomers. Preferably the pigment comprises a copolymer consisting essentially of soy protein and a vinyl monomer thereby providing a polymeric pigment that can be used as nearly a total or at the very least a partial replacement for conventional inorganic pigments employed in paper coating compositions. Paper coating compositions containing the polymeric pigment of the present invention have been found to have an improved runability, gloss, ink holdout and water resistance when applied to a paper substrate. Additionally, coating compositions having the pigment of the present invention have an improved degree of strength as compared to conventional polymeric pigments. The coating preparation process is also simplified by eliminating the need to prepare and add a separate protein fraction to the coating formulation.

The polymeric pigment of the present invention is formed by a copolymerization process between a protein such as an animal or vegetable protein and a monomer or mixture of monomers such as styrene or methyl methacrylate to provide a polymeric pigment that has a glass transition temperature or softening point which exceeds any temperature typically involved in a paper coating process. This provides the paper surface to which the coating composition is applied, with an improved degree of gloss and printability that is not normally achieved when an inorganic pigment is used as the sole pigment component in a paper coating composition.

A process for the production of a polymeric pigment is set forth in the present invention, wherein the polymeric pigment is a copolymer of a protein and a monomer having a glass transition temperature greater than about 70° C. The process comprises forming an aqueous dispersion of a protein either casein or soy protein at a pH of about 9 to 10.5, which is then combined with the monomer or mixture of monomers. Either simultaneous with the addition of the monomer or by separate addition, an azo initiator is added to the reaction mixture. Copolymerization is allowed to proceed at a temperature of about 55° to 75° C. for a period of time of about 4 to 12 hours, or until such time as substantial copolymerization results.

A unique aspect of the present invention is an ability to control the particle size of the polymeric pigment that is produced by copolymerization of the protein material with the monomer having a high glass transition temperature. It is important in certain types of paper coating applications that the pigment represent a certain average particle size to provide the described degree of opacity or other coating characteristics. Particle size control of the pigment produced pursuant to the present invention is achieved by control of the protein level contained in the aqueous dispersion, prior to addition of the monomer. If for example, the protein level in the aqueous dispersion before addition of the monomer, is kept at a relatively low level, the emulsion formed when the protein solution and monomer are mixed is "starved" for the protective colloid properties of the protein. This is minimized to the point that the system forces the formation of larger micelles of monomer which are then copolymerized to form particles having a larger average particle size. The remaining protein is then added following the actual polymerization step. If a smaller particle size is desired, all of the protein is included in the aqueous dispersion prior to addition of the monomer.

Another unique property of the current invention is improved coating water resistance. This effect is a result of the higher surface tension of the pigment composition of the present invention due to the absence of surfactants in the reaction mixture.

DESCRIPTION OF THE PREFERRED EMBODIMENTS

The polymeric pigments of the present invention comprise a copolymer of a protein and a monomer or combination of monomers having a glass transition temperature greater than about 70° F. The protein employed in the copolymerization procedure is relatively non-critical and can be selected from a wide variety of protein materials including animal and vegetable proteins such as soy protein and casein. It is preferred that an isolated soy protein be employed, most preferably a chemically modified soy protein, such as described in U.S. Pat. No. 4,474,694 herein incorporated by reference. This type of isolated soy protein is a carboxylated soy protein and has a high anionic charge. The isolated soy protein is initially formed into an aqueous dispersion by dispersal of about 4 to 60% on a dry basis, of the reaction mixture, of isolated soy protein, into water at a temperature of about 60° C. Ammonium hydroxide, or other suitable basic material is added to the dispersion to solubilize the protein. A typical pH range required to solubilize the above mentioned chemically modified soy protein is about pH 9 to about pH 11. Before reaction. It is usually desirable to sparge all reactants used in the polymerization reaction with nitrogen or other suitable inert gas to remove as much dissolved oxygen as possible that might interfere in the polymerization reaction. Most copolymerization reactions should be conducted in a suitable container or reaction vessel with means for evacuating the container and/or for the addition of an inert gas, so that the reaction is carried out under an atmosphere that is relatively free of oxygen. This greatly improves the efficiency of the polymerization reaction, but is not a critical parameter.

In a separate container, an aqueous prepolymerization emulsion or pre-emulsion of a monomer or mixture of monomers is formed by dispersal of 40 to 96% monomer by weight of the pre-emulsion solids with the balance comprising the aqueous dispersion of protein solids. The monomer employed in the present invention, can be selected from a wide variety of monomers that fall into this general category which have a relatively high glass transition temperature. The glass transition temperature is the temperature at which a change in an amorphous region of a partially crystalline polymer from a viscous or rubbery condition to a hard and relatively brittle "glass" like state. It is desirable that the copolymer pigments produced pursuant to the present invention have a relatively high glass transition temperature, to thereby prevent substantial melting of the polymeric pigment during the elevated temperatures normally encountered during the coating and drying of paper substrates. For the most part, these temperatures do not exceed about 70° C. and the use of monomers which have glass transition temperatures above this, imparts to the copolymer, a resistance to melting during the temperatures normally encountered during the coating and drying of paper substrates. Suitable monomers that can be employed in the present invention either alone or in combination, include the styrene monomers such as α-styrene, which has a specific glass transition temperature of about 100° C., methyl styrene, methoxy styrene, butyl styrene, hydroxy methyl styrene, chlorostyrene, dichlorostyrene, ethyl styrene, bromostyrene, cyanostyrene and ethoxystyrene and acrylate monomers such as methyl methacrylate, which has a specific glass transition temperature of about 115° C. Monomers with lower glass transition temperatures can be combined with the monomers listed above to control the glass transition temperature on the polymeric pigment, provided that the composite glass transition temperature of such a mixture is above about 70° C.

The other primary ingredient in the copolymerization reaction is an initiator. Typically, this is a free radical initiator. With the preferred material being azo nitriles. Specific azo initiators include 2,2'-azobis (2,4-dimethylpentanenitrile, 2,2'-azobis (2-methylbutanenitrile), 1,1'azobis (cyclohexanecarbonitrile), and 2,2'-azobis (2-methylpropanenitrile). These azo initiators can be included in prepolymerization emulsion comprising the Combination of the monomer and the protein solution if desired, but the preferred and most desirable procedure is to separately add the azo initiator dissolved in a suitable solvent simultaneously over approximately the same time period as the pre-emulsion is added. The amount of azo initiator needed, is that which is sufficient to initiate the polymerization reaction, and typically this is about 0.15 to 2.0% by weight of the reaction mixture on a dry basis.

As previously noted, a unique aspect of the present invention is the ability to control the average particle size of the polymeric pigment by controlling the level of protein contained in the pre-emulsion. For the most part, the exact size of the pigment within a limited broad range for use in paper coating compositions is not critical, yet it is desirable to have control of the particle size to optimize the pigment for a wide variety of coating applications.

Within the general range of protein employed in the reaction mixture, if about 100% of the described amount of the protein is utilized in preparation of the pre-emulsion, an average particle size for the pigment is about 0.09 to 0.12 microns. If less than 10% protein based on dry weight of the reaction mixture is used to form the pre-emulsion, then an average particle size for the pigment is about 0.20 to 0.60 microns. The actual polymerization takes placed in a reaction vessel after the monomer and initiator have been combined at an elevated temperature. Water is added to the empty reaction vessel and heated to about 60°–70° C. while being sparged with nitrogen. This temperature is maintained throughout the reaction. The nitrogen sparge is terminated leaving a nitrogen atmosphere or blanket in the reaction vessel. The pre-emulsion and initiator are added to the reaction vessel simultaneously over a period of 1 to 4 hours, preferably about 2 hours. Following addition of the pre-emulsion and initiator, the reaction mixture is maintained at a temperature of about 65° C. for an additional 4 hours. Following this, the reaction mixture is cooled, and if desired, additional protein solution, antioxidants, biocides, defoamers, or similar materials may be added to the copolymer formed in the reaction mixture to improve either its stability or functionality in paper coating compositions.

The copolymer of protein and the monomer having a glass transition temperature greater than about 70° C. contained in the aqueous reaction mixture can then be employed as a pigment in coatings that are typically applied to paper. The copolymer dispersion at this point has a solids level of about 30 to 50% by weight, a pH of about 8 to 10, and an average particle size generally within the range of 0.09 to 0.60 microns. The dispersion of copolymer has a viscosity of about 100 to 2000 cps at 25° C., and typically will have a free monomer level of less than about 0.5% by weight. In the event that the free monomer level exceeds this, it may be necessary to strip the latex of any residual monomers and this is accomplished by conventional means. While the present invention is not intended to be limited by the exact types of coating compositions in which the pigment of the present invention may be employed, nevertheless, typical coating compositions which would employ the polymeric pigment material composition of the present invention, would generally also include an inorganic pigment as well as fluidizers, thinning agents and an adhesive binder or mixture of binders such as acetate, acrylate, styrene butadiene latexes, or protein.

Typically a coating composition is prepared by initially forming a dispersion of the protein adhesive binder that might be employed for the coating composition. Typically this material is also an isolated soy protein, preferably also a chemically modified soy protein, such as that described in U.S. Pat. No. 4,474,694. The protein adhesive binder is usually dispersed in a solubilizing agent such as an alkaline material, typically sodium carbonate, ammonium hydroxide, sodium hydroxide and the like. These materials provide a conventional means of solubilizing various types of protein materials for use as adhesive binders in paper coating compositions. The exact amount of protein isolate and cobinder required a$ the adhesive portion of the coating is of a sufficient level so when the coating composition with the pigment is prepared, about 8 to 20% by weight of the coating comprises binder on a dry basis.

It may also be desirable to further employ fluidizers or thinning agents in the preparation of the protein binder solution. This will improve the ultimate viscosity of coating solutions and typical fluidizers include materials such as dicyandiamide, ammonium nitrate or urea. These agents may be employed in the preparation of the binder solution and are added in amounts of between about 5 to 20% preferably 5 to 10% by weight of the protein used to prepare the binder.

Following the formation of the protein binder solution, it is mixed with a pigment composition or dispersion in an amount sufficient to opacify said coating composition when the coating composition is applied to a paper substrate. Typically the polymeric pigment material is employed in a pigment containing coating composition as a partial replacement for a portion of the inorganic pigment that represents a conventional ingredient in the coating composition. Typically, the polymeric pigment material of the present invention may replace the inorganic pigment material in the coating composition to a level of about 1 to 20% by weight of the inorganic pigment material on a dry basis and preferably 5 to 15% by weight of the inorganic pigment material on a dry basis. Inorganic pigments that may be employed in the coating composition of the present invention can be selected from a wide variety of inorganic pigments conventionally used in pigment containing paper coatings. Typically, the preferred inorganic pigment is clay. Following the formation of the protein binder solution and a slurry of the pigment composition, or dispersion of the present invention, the pigment composition will have a total solids level of at least about 36% by weight and typically between about 38 and 60% by weight of the slurry. The exact total amount of pigment including inorganic and polymeric pigment, which may be employed in the present invention, is not critical since a variety of levels may be suitable depending upon the exact coating characteristics desired. It is therefore typical to employ the pigment in the overall coating composition in an amount sufficient to provide a uniform coating on the substrate.

Following dispersion of the pigment composition with the proteinaceous binder solution various other ingredients may be added such as the various latexes or other materials that may improve the coating characteristics of the composition. The exact components of the coating composition with which the polymeric pigment material of the present invention may be employed is not critical to its practice since these represent a variety of materials all of which are well known to those skilled in the art. The following examples represent specific but non-limiting embodiments of the present invention.

EXAMPLE 1

An isolated, chemically modified soy protein isolate, produced as described in U.S. Pat. No. 4,474,694 was formed into a solution by dispersal of 50 g of the above isolate in 273 g of water at a temperature of 60° C. followed by the addition of 10 g. of concentrated ammonium hydroxide. The aqueous soy protein isolate solution was then sparged with nitrogen. Styrene (278 g.) was then sparged with nitrogen, combined with the protein solution and mixed for 15 minutes under a nitrogen blanket to form a prepolymerization emulsion or pre-emulsion. The pre-emulsion of protein and styrene monomer was then placed in an addition funnel for dropwise addition into a reaction vessel that was equipped for the maintenance of a substantially inert atmosphere during chemical reaction.

Separately a VAZO 52 catalyst or initiator available from Dupont, identified as 2,2'-azobis(2,4-dimethylpentanenitrile)(0.56 g) was dissolved in 22.2 g of toluene and placed in a suitable container for controlled addition to the reaction vesse. Water (230 g) was added to the reaction vessel and heated to a temperature of 65° C. The pre-emulsion of monomer and protein and the catalyst solution were added as separate feeds into the reaction vessel containing the water, in dropwise fashion over a period of two hours, with mixing. Following addition of all reactants the reaction mixture was held at 65+ C. for four hours. To the reaction mixture 1.53 g of Proxel GXL, a chemical biocide available from ICI Americas was added for microbiological stabilization of the reaction mixture. The reaction mixture had a solids content of 33.0% by weight. The reaction mixture contained a copolymer of soy protein and styrene with an average particle size of between about 0.09 to 0.14 microns.

EXAMPLE 2

An isolated, chemically modified soy protein isolate, produced as described in U.S. Pat. No. 4,474,694 was formed into a solution by dispersal of 49.5 g of the isolate in 270.5 g of 60 c. water followed by the addition of 9.9 g of concentrated ammonium hydroxide. The aqueous soy protein isolate solution was then sparged with nitrogen. VAZO 52 catalyst or initiator available from Dupont, identified as 2,2'-azobis (2,4-dimethylpentanenitrile)(4.12 g) was dissolved in styrene monomer (274.9 g) and sparged with nitrogen. The styrene monomer and Vazo 52 solution was then combined with 128.3 g of the protein solution and mixed for 15 minutes under a nitrogen blanket to form a prepolymerization emulsion or pre-emulsion. The pre-emulsion of protein and styrene monomer and Vazo 52 initiator was then placed in an addition funnel for dropwise addition into a reaction vessel that was equipped for the maintenance of a substantially inert atmosphere during chemical reaction.

Water (242.7 g) was added to the reaction vessel and heated to a temperature of 65° C. The pre-emulsion of monomer, initiator, and protein was added into the reaction vessel containing the water in dropwise fashion over a period of two hours, with mixing. Following addition of the pre-emulsion the reaction mixture was held at 65° C. for four hours. To the reaction mixture the remaining 201.6 g of protein solution was added followed by 1.53 g of Proxel GXL, a chemical biocide available from ICI Americas. The reaction mixture had a solids content of 33.0% by weight. The reaction mixture contained a copolymer of soy protein and styrene with an average particle size of between about 0.26 to 0.38 microns.

EXAMPLE 3

The polymeric pigments produced in Examples 1 and 2 were then partially substituted for an inorganic pigment in a pigment containing paper coating composition at a level of 9.8% by weight of the inorganic pigment on a dry basis, which was then evaluated for coating performance when the coating composition was applied to a paper substrate. Pigment coating composition containing the polymeric pigments of examples 1 and 2 were compared to coating compositions in which only an inorganic pigment was used or a coating composition in which a pigment, identified as DOW Pigment 722, available from Dow Chemical Company, Midland, Mich., was used as a partial replacement for the inorganic pigment. Literature accompanying the above plastic pigment identifies the pigment as being produced in accordance with U.S. Pat. Nos. 3,779,800; 3,853,579 and 3,949,138. The coating compositions formulas are set forth in Table 1 below.

TABLE 1

| Coating Composition Formulas | | | | |
|---|---|---|---|---|
| Coating Composition | A | B | C | D |
| Ingredient (grams) | | | | |
| Clay slurry (a) | 363.75 | 333.71 | 333.71 | 334.29 |
| Protein Binder Solution (b) | 50.87 | 20.31 | 20.31 | 50.87 |
| Styrene - Butadiene Latex | 61.04 | 60.94 | 60.94 | 61.04 |
| Copolymer Pigment of Example 1 | — | — | 84.64 | — |
| Copolymer Pigment of Example 2 | — | 84.64 | — | — |
| Plastic Pigment Dow 722 | — | — | — | 43.29 |
| Water | 24.73 | 0.41 | 0.41 | 10.51 |
| TOTAL (grams) | 500 | 500 | 500 | 500 |

(a) Clay slurry comprises a dispersion of 698.5 g of #1 clay and 3.5 g Dispex N-40 dispersant in 298 g of water.
(b) Chemically modified soy isolate processed as described in U. S. Pat. No. 4,474,694, dispersed to a solids level of 15% in 0.3 M ammonium hydroxide solution.

Each coating composition, containing the different pigment compositions was applied to a paper substrate using a draw down bar. The coated paper was evaluated for brightness, gloss. IGT pick strength, wet rub resistance, and ink receptivity. The IGT value measures the force the coating will withstand before picking with certain types of ink used in printing. The ink receptivity is measured by the percentage drop in coating brightness after a standardized K&N ink has been applied. Lower drops in brightness indicates a less porous coating with greater ink holdout. These various methods of measurement are published by the Technical Association of Pulp and Paper Industries (TAPPI). The results of this testing are set forth in Tables 2 a 3 below.

TABLE 2

| Coating Performance of Coating Compositions | | | |
|---|---|---|---|
| Coating Composition | A | D | B |
| Coatweight (gm/m2) | 13.7 | 13.7 | 14.2 |
| Brightness | 76.4 | 76.6 | 76.3 |
| Coating Gloss | 68.2 | 74.3 | 73.4 |
| Opacity: | | | |
| Before calendering | 94.1 | 95.1 | 95.4 |
| After calendering | 92.8 | 92.6 | 92.9 |
| IGT pick strength: | | | |
| Velocity (cn/sec) | 248 | 230 | 218 |
| Ink #/Speed/Pressure | 5/M/50 | 5/M/50 | 5/M/50 |
| K & N Ink Receptivity Brightness Drop (%) | 13.8 | 12.7 | 9.1 |
| Wet Rub Resistance | 85.3 | 86.8 | 85.8 |
| Ink Gloss | 97.1 | 100 | 100 |

TABLE 3

| Coating Performance of Coating Composition | | | |
|---|---|---|---|
| Coating Composition | A | D | C |
| Coatweight (gm/m2) | 10.3 | 10.3 | 10.7 |
| Brightness | 77.7 | 78.5 | 78.2 |
| Coating Gloss | 67.6 | 73.7 | 72.6 |
| Opacity: | | | |
| Before calendering | 93.6 | 94.1 | 94.1 |
| After calendering | 91.9 | 92.8 | 92.2 |
| IGT Pick Strength: | | | |
| Velocity (cn/sec) | >250 | >250 | >250 |
| Ink #/Speed/Pressure | 5/M/50 | 5/M/50 | 5/M/50 |
| K & N Ink Receptivity Brightness Drop (%) | 14.7 | 16.0 | 14.4 |
| Wet Rub Resistance | 89.2 | 91.1 | 95.2 |
| Ink Gloss | 83.8 | 86.6 | 88.7 |

Examination of the data set forth in Tables 2 and 3 indicates the addition of protein copolymer pigment of the present invention to the coating formulation significantly increases the coating's gloss and ink gloss properties of coatings containing the pigment when compared to the coating formulation with no polymeric pigment. The protein copolymer pigment showed similar but improved coating performance properties as the Dow Plastic Pigment 722, available from Dow Chemical Company, Midland, Mich.

EXAMPLE 4

The polymeric pigments produced in example 1 and 2 were then partially substituted for an inorganic pigment, in a pigment containing paper coating composition at a level of 15% by weight of the inorganic pigment on a dry basis. The coating included a soy protein adhesive co-binder system at a level of 12% by weight of the inorganic pigment on a dry basis. These coatings were compared to two coatings each containing a conventional plastic pigment identified as Dow Plastic Pigments 722, (large particle size 0.35 to 0.55 microns) and 788, (small particle size (0.11 to 0.15 microns), both of which are available from Dow Chemical Company, Midland, Mich. These pigments were also used at a level of 15% by weight of the inorganic pigment on a dry basis. These coatings also included a soy protein adhesive co-binder system at a level of 12% by weight of the inorganic pigment on a dry basis. All coatings were evaluated as described in Example 3 and as compared to a coating containing only inorganic pigment. The formulations of each coating and performance properties are set out in Table 4 below.

TABLE 4

| | Polymeric Pigments of Present Invention, and Conventional Plastic Pigments | | | | |
|---|---|---|---|---|---|
| | Control | Dow Pigment 722 | Dow Pigment 788 | Pigment of Example 1 | Pigment of Example 2 |
| Coating Formulation | | | | | |
| Coating Solids | 53.5% | 53.5% | 53.5% | 53.5% | 53.5% |
| Inorganic Pigment (Clay) | 100 parts | 85 parts | 85 parts | 85 parts | 85 parts |
| Bunder Level | 12 parts | 12 parts | 12 parts | 12 parts | 12 parts |
| Polymeric Pigment | 0 | 15 parts | 15 parts | 15 parts | 15 parts |
| Coating Performance Data | | | | | |
| Brightness | 79.2 | 79.3 | 78.3 | 79.3 | 78.1 |
| Gloss | 62 | 68 | 72.7 | 65.3 | 60.8 |
| Opacity: | 94.3 | 93.7 | 94.2 | 94.6 | 94.2 |
| IGT Pick Strength 5/M/50 | 160 | 152 | 137 | 178 | 165 |
| K & N Ink Receptivity: | | | | | |
| Brightness Drop (%) | 25.2 | 22.3 | 19.4 | 22.9 | 17.5 |
| Wet Rub | 95 | 91.5 | 95.3 | 95.4 | 95.2 |
| Ink Gloss: | 87.6 | 96.2 | 89 | 88.1 | 95.8 |
| Coatweight (g/m2) | 14.1 | 14.7 | 14.6 | 14.5 | 14.9 |
| Viscosity | | | | | |
| Brookfield RVT, 10 RP | 1300 | 2500 | 3200 | 2100 | 5000 |
| Brookfield RVT, 20 RP | 900 | 1650 | 2050 | 1550 | 3250 |
| Brookfield RVT, 50 RP | 520 | 940 | 1132 | 1340 | 1820 |
| Brookfield RVT, 100 RP | 346 | 614 | 730 | 814 | 1216 |
| Hercules (4400 RPM) | 17.7 | 19.5 | 19.5 | 29.2 | 33.3 |

The data in Table 4 shows the improvement in strength of the coating when the polymeric pigment of the present invention is used as compared to commercially available plastic pigments. While the gloss values with the pigment of the present invention were not as desirable as those with the commercially available pigments, they were believed to be less in the above example because of the higher level of protein used in the coating composition with the pigments of the present invention.

EXAMPLE 5

331.95 g of casein was dipsersed in 133 g of water at a temperature of 60° C. followed by the addition of 10 g concentrated ammonium hydroxide. The aqueous dispersion of protein was then sparged with nitrogen. Styrene (276.63)9 was then sparged with nitrogen, combined with the protein solution and mixed for 15 minutes under a nitrogen blanket to form a pre-emulsion. The pre-emulsion of protein and styrene monomer was then placed in an additive funnel for dropwise addition into a reaction vessel that was equipped for the maintenance of a substantially inert atmosphere during chemical reaction. Separately, a VA20 52 catalyst or initiator available from Dupont, identified as 2.2'-azo bis (2.4)-dimethyl pentanenitrile)(2.07 g) was dissolved in 27.66 g of toluene and placed in a suitable container for controlled addition to the reaction vessel. Water (157 g) was added to the reaction vessel and heated to a temperature of 65° C. The monomer and protein pre-emulsion and the catalyst were added as separate feeds into the reaction vessel, containing the water in dropwise fashion over a period of 4 hours with mixing. Following addition of all reactants, the reaction mixture was held at 65° C. for 4 hours. The reaction mixture had a solids level of 33% by weight and contained a copolymer of casein and styrene with an average particle size of 0.08–0.12 microns. While the present invention has been described with regard to the specific embodiments shown above, it should be understood that it is intended to include all equivalents thereto within the scope of the present invention.

We claim:

1. A paper coating composition comprising an aqueous dispersion of isolated soy protein in an amount effective to bind said composition to a paper substrate, and an aqueous dispersion of a pigment in an amount effective to opacify said composition when applied to a paper substrate, wherein said pigment dispersion comprises a mixture of an inorganic pigment and a polymeric pigment wherein the polymeric pigment comprises a copolymer consisting essentially of protein and a monomer having a glass transition temperature greater than about 70° C.

2. The composition of claim 1 wherein the mixture comprises about 1 to 20% by weight of the inorganic pigment on a dry basis.

3. The composition of claim 2 wherein the mixture comprises about 5 to 15% polymeric pigment by weight of the inorganic pigment on a dry basis.

4. The composition of claim 1 wherein the pigment dispersion has a solids level of at least about 36% by weight of said composition.

5. The composition of claim 1 wherein the inorganic pigment is clay.

6. The composition of claim 1 wherein the monomer is a vinyl monomer.

7. The composition of claim 1 wherein the polymeric pigment has an average particle size of about 0.09 to 0.12 microns.

8. The composition of claim 1, wherein the polymeric pigment has an average particle size of about 0.20 to 0.60 microns.

9. The composition of claim 1 wherein said polymeric pigment dispersion has a viscosity of about 100 to 2.500 cps at 25° C. and a free monomer level of less than about 0.5% by weight.

10. The composition of claim 1 wherein the protein is selected from the group consisting of casein and soy protein.

11. The composition of claim 10 wherein the soy protein comprises an anionic carboxylated soy protein.

12. The composition of claim 1 wherein the monomer comprises styrene.

13. A process of forming a paper coating composition comprising:
   (a) forming an aqueous dispersion of isolated soy protein in an amount effective to form an adhesive binder for said composition;
   (b) mixing said dispersion with an aqueous dispersion of a pigment comprising a mixture of an inorganic pigment and a polymeric pigment wherein the polymeric pigment comprises a copolymer consisting essentially of a protein and a monomer having a glass transition temperature greater than about 70° C., to form a paper coating composition.

14. The process of claim 13 wherein the pigment mixture comprises about 1 to 20% polymeric pigment by weight of the inorganic pigment on a dry basis.

15. The process of claim 14 wherein the pigment mixture comprises about 5 to 15% polymeric pigment by weight of the inorganic pigment on a dry basis.

16. The process of claim 13 wherein the inorganic pigment is clay.

17. The process of claim 13 wherein the pigment dispersion has a solids level of at least about 36% by weight of said composition.

18. The process of claim 13 wherein the monomer is a vinyl monomer.

19. The process of claim 13 wherein the polymeric pigment has an average particle size of about 0.09 to 0.12 microns.

20. The process of claim 13 wherein the polymeric pigment has an average particle size of about 0.20 to 0.60 microns.

21. The process of claim 13 wherein said polymeric pigment dispersion has a viscosity of about 100 to 2500 cps at 25° C. and a free monomer level of less than about 0.5% by weight.

22. The process of claim 13 wherein the protein is selected from the group consisting of soy protein and casein.

23. The process of claim 13 wherein the monomer comprises styrene.

24. A process for the production of a polymeric pigment wherein the pigment consists essentially of a copolymer of protein and a monomer comprising:
   (a) forming an aqueous dispersion of protein;
   (b) reacting said protein with a monomer having a glass transition temperature greater than about 70° C. in the presence of an azo initiator in an amount sufficient to initiate the reaction and form a copolymer thereof.

25. The process of claim 24 wherein the protein is selected from the group consisting of soy protein and casein.

26. The process of claim 25 wherein the soy protein comprises an anionic carboxylated soy protein.

27. The process of claim 24 wherein the amount of initiator is about 0.15 to 2.0% by weight of the reaction mixture on a dry basis.

28. The process of claim 24 wherein the monomer comprises a vinyl monomer.

29. The process of claim 25 wherein the reaction is carried out under an inert atmosphere.

30. The process of claim 25 wherein the dispersion of soy protein has a pH of about 9 to 11.

31. The process of claim 24 wherein the dispersion of protein contains about 4 to 60% by weight on a dry basis protein based on the reaction mixture.

32. The process of claim 24 wherein less than about 10.% by weight of the protein is dispersed before addition of the monomer and initiator, followed by the addition of the balance of the protein after addition of the catalyst and monomer to the reaction mixture.

33. The process of claim 24 wherein about 100% by weight of the protein is dispersed before addition of the monomer and initiator to the reaction mixture.

34. A copolymeric pigment consisting essentially of protein and a monomer having a glass transition temperature greater than about 70° C.

35. The pigment of claim 34 wherein the protein is selected from the group consisting of soy protein and casein.

36. The pigment of claim 35 wherein the soy protein comprises an anionic carboxylated soy protein.

37. The pigment of claim 31 wherein said monomer comprises a vinyl monomer.

38. The pigment of claim 37 wherein the vinyl monomer is a styrene monomer.

39. The pigment of claim 37 wherein the vinyl monomer is selected from the group consisting of α-styrene, methyl styrene, methoxy styrene, butyl styrene, hydroxy methyl styrene, chlorostyrene, dichlorostyrene, ethyl styrene, bromostyrene, cyanostyrene and ethoxystyrene.

40. The pigment of claim 34 wherein the monomer comprises an acrylate monomer.

41. The pigment of claim 40 wherein the acrylate monomer is methyl methacrylate.

* * * * *